(12) United States Patent
Boran et al.

(10) Patent No.: US 10,667,103 B2
(45) Date of Patent: *May 26, 2020

(54) METHOD AND APPARATUS FOR SOFTWARE DEFINED SENSING

(71) Applicant: Alcatel Lucent, Nozay (FR)

(72) Inventors: Aidan Boran, Longwood (IE); Alan P. Leddy, Greystones (IE)

(73) Assignee: Alcatel Lucent, Nozay (FR)

( * ) Notice: Subject to any disclaimer, the term of this patent is extended or adjusted under 35 U.S.C. 154(b) by 36 days.

This patent is subject to a terminal disclaimer.

(21) Appl. No.: 16/014,718

(22) Filed: Jun. 21, 2018

(65) Prior Publication Data

US 2018/0302774 A1 Oct. 18, 2018

Related U.S. Application Data

(63) Continuation of application No. 14/505,649, filed on Oct. 3, 2014, now Pat. No. 10,038,990.

(51) Int. Cl.
*G06F 11/00* (2006.01)
*H04W 4/70* (2018.01)

(52) U.S. Cl.
CPC .................................... *H04W 4/70* (2018.02)

(58) Field of Classification Search
CPC ...................................................... H04W 4/70
See application file for complete search history.

(56) References Cited

U.S. PATENT DOCUMENTS

| 10,038,990 | B2* | 7/2018 | Boran | H04W 4/70 |
| 2009/0066441 | A1* | 3/2009 | Woods | H01P 5/107 333/34 |
| 2009/0066641 | A1 | 3/2009 | Mahajan et al. | |
| 2013/0232402 | A1* | 9/2013 | Lu | G06F 9/542 715/234 |
| 2015/0178817 | A1* | 6/2015 | Fein | H04W 4/21 705/26.81 |

OTHER PUBLICATIONS

Z. Shelby et al., "The Constrained Application Protocol (CoAP)", Internet Standards Track Document, Internet Engineering Task Force (IETF), University of Bremen, Jun. 2014, 112 pp.
DSLHome-Technical Working Group, Jeff Bernstein (2WIRE) and Tim Spets (Westell), Editors, "CPE WAN Management Protocol", Technical Report, DSL Forum, TR-069, May 2004, 109 pp.

* cited by examiner

*Primary Examiner* — Phuong Huynh
(74) *Attorney, Agent, or Firm* — Chiesa Shahinian & Giantomasi PC (57) ABSTRACT

Systems and methods for configuring a sensor on a controller include receiving a sensor description defined in a format of a domain specific language corresponding to the sensor. The sensor description is parsed to identify one or more instructions. The one or more instructions are mapped to corresponding commands of the controller to enable the controller to perform the one or more instructions.

20 Claims, 7 Drawing Sheets

```
{
    "Sensor": {                                                    300
        "debug": "on",
        "description": {
            "name": "LDR - Light Sensor",
            "type": "LDR",
302         "model": "500",
            "serialnumber": "123456",
            "dataport": 1,
            "URI": "#SENSORuRI"
        },
        "accessCode": {
            "setup":   { "s1": "pinMode (1, I ) "},         ── 306
304         "access":  { "s1": "AnalogRead"},               ── 308
            "process": { "s1": "div 1", "s2": "mlt 12", "s3": "add 1"}, ── 310
            "return":  { "type": "int"} ── 312
        }
    }
}
```

FIG. 4

```
{
    "Sensor": {                                                    400
        "debug": "on",
        "description": {
            "name": "Dallas One Wire Temp",
            "type": "Temp",
402         "model": "18S20",
            "serialnumber": "Unkn",
            "dataport": 2,
            "URI": "#SENSORuRI"
        },
        "accessCode": {
            "setup":   { "s1": "1wbus(2)", "s2": "1wselect (1)"}, ── 406
404         "access":  { "s1": "1wread"}, ── 408
            "process": { "s1": "sub 32", "s2": "mlt 9", "s3": "div 9"}, ── 410
            "return":  { "type": "int"} ── 412
        }
    }
}
```

FIG. 5

```
{
    "Sensor": {                                                    500
        "debug": "on",
        "description": {
            "name": "LDR - Light Sensor",
            "type": "LDR",
502         "model": "500",
            "serialnumber": "123456",
            "dataport": 1,
            "URI": "#SENSORuRI"
        },
        "accessCode": {
            "setup":   { "s1": "pinMode (1,I)"},     ⟵ 506
504     {   "access":  { "s1": "AnalogRead"},        ⟵ 508
            "process": { "s1": "map (0, 255) "},     ⟵ 510
            "return":  { "type": "int"}              ⟵ 512
        }
    }
}
```

| SENSOR COMMAND | CATEGORY | DESCRIPTION |
| --- | --- | --- |
| pinMode | Core | Enable and configure a pin |
| analogRead | Core | Read voltage from an analog pin |
| digitalRead | Core | Read a value from a digital pin |
| digitalWrite | Core | Write a value to a digital pin |
| analogWrite | Core | Write a value to an analog pin |
| interrupts | Core | Enable interrupts |
| attachInterrupt | Core | Attach an interrupt to a pin |
| detachInterrupt | Core | Remove interrupt |
| 1wbus | OneWire Bus | Setup 1-wire bus |
| 1wsearch | OneWire Bus | Search for devices on 1-wire bus |
| 1wreset | OneWire Bus | Reset 1-wire bus |
| 1wselect | OneWire Bus | Select a device on 1-wire bus |
| 1wread | OneWire Bus | Read value from selected device |
| SPIBegin | SPI Bus | Start SPI Bus |
| SPIEnd | SPI Bus | Stop SPI Bus |
| SPITransfer | SPI Bus | Transfer data on SPI bus |
| SPISetDataMode | SPI Bus | Configure data mode on SPI bus |
| SPISetClock | SPI Bus | Configure clock options for SPI |
| SPISetBitOrder | SPI Bus | Configure bit options for SPI |
| Div | Math | Simple division |
| Mlp | Math | Simple multiplication |
| Sub | Math | Simple subtraction |
| Add | Math | Simple addition |

METHOD AND APPARATUS FOR SOFTWARE DEFINED SENSING

CROSS-REFERENCE TO RELATED APPLICATIONS

This application is a continuation of U.S. patent application Ser. No. 14/505,649, filed Oct. 3, 2014, the disclosure of which is incorporated by reference herein in its entirety.

BACKGROUND OF THE INVENTION

The present invention relates generally to sensors and more particularly to the configuration of sensors on a controller.

Smart devices are expected to create orders of magnitude growth of intelligent services and data transmitted across networks. However, the growth of smart sensors and sensor networks have been restricted by the complexity associated with their setup and configuration. This has resulted in many vertical solutions which provide specialized sensing capability but with limited adaptivity and opportunity for integration into other sensor networks.

Current construction and configuration of a sensor network is a complex task, typically requiring expert technicians to provide a custom implementation of the sensor network targeted for a specific application. There are a number of options available for configuring the sensor network, including different sensor types, processing and storage options, application and visualization features, and communication protocols. However, each configuration option is chosen for a specific implementation of the sensor network. This has led to the proliferation of new and heterogeneous network data models and protocols. These current sensing solutions tend to be very static, expensive, and time consuming approaches for the deployment of sensor networks.

BRIEF SUMMARY OF THE INVENTION

In accordance with an embodiment, a sensor on a controller is configured by receiving a sensor description defined in a format of a domain specific language corresponding to the sensor. The sensor description is parsed to identify one or more instructions. The one or more instructions are mapped to corresponding commands of the controller to enable the controller to perform the one or more instructions. The corresponding commands of the controller may be performed to configure the sensor on the controller.

The sensor description may be determined based on messages received from the sensor. In one embodiment, the messages received from the sensor may include information identifying the sensor, such as, e.g., a specification of the sensor. The sensor description may be predefined by a user or manufacturer.

The sensor description may include instructions for a plurality of steps, including a setup step, a data access step, and a data processing step. The one or more instructions parsed from the sensor description may be grouped according to the plurality of steps.

Mapping the one or more instructions to corresponding commands of the controller may include searching a lookup table to determine the corresponding commands of the controller from the one or more instructions. In one embodiment, additional corresponding commands may be received for the lookup table to perform the mapping for a different controller type.

These and other advantages of the invention will be apparent to those of ordinary skill in the art by reference to the following detailed description and the accompanying drawings.

DETAILED DESCRIPTION

Figure 1:
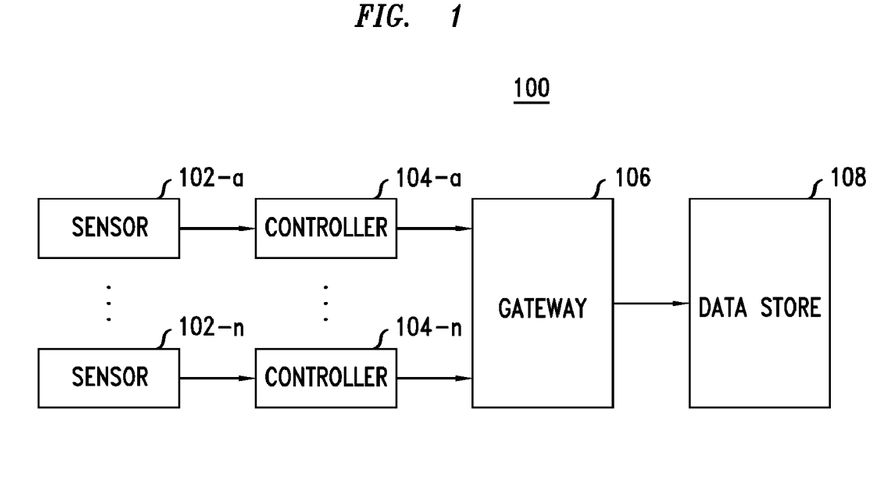
FIG. 1 shows a high-level block diagram of an architecture for implementing sensors.

FIG. 1 shows a high-level block diagram of an architecture 100 for implementing sensors, in accordance with one or more embodiments. Architecture 100 includes sensors 102-a, . . . , 102-n (collectively referred to as sensors 102) communicatively coupled to controllers 104-a, . . . , 104-n (collectively referred to as controllers 104), respectively. It should be understood that architecture 100 may include any number of sensors 102 and controllers 104, and that each controller 104 may be coupled to any number of sensors 102. Sensors 102 may include, e.g., light sensors, temperature sensors, infrared sensors, magnetic sensors, moisture sensors, or any other type of sensor.

Sensors 102 may output data (e.g., instructions or messages) to controllers 104 via any communications interface. The communications interface of sensors 102 may include standard or non-standard implementations. Exemplary standard implementations include an I2C (Inter-Integrated Circuit) standard, an SPI (Serial Peripheral Interface) standard, and a 1-wire standard. Other higher level abstractions that sit on top of SPI and I2C which abstract specific parts or functions of SPI and I2C or tailored to specific sensors or classes of sensor may also be included. Each of the sensors 102 may employ a same or different communication interface implementation to communicate with controllers 104.

Sensors 102 may output messages comprising an output signal. For example, sensors 102 may include analog sensors outputting, e.g., a voltage, current, charge, resistance, capacitance, etc. In another example, sensors 102 may include digital sensors outputting, e.g., pulses, frequencies, etc. The output messages may include, e.g., control messages for configuring sensors 102 or observational messages indicating observations of sensors 102.

Controllers 104 may include a processor (e.g., microprocessor), a communications interface (e.g., transceiver), and one or more analog and/or digital sensor ports for interfacing with sensors 102. Controllers 104 may be configured with sensor controller software, which is typically loaded onto controllers 104 during manufacturing and generally do not change once operational. Controllers 104 are communicatively coupled to gateway 106 by any suitable wired and/or wireless communications interface, such as those discussed above with respect to sensors 102.

Gateway 106 may include the same or similar hardware as controllers 104 but without the sensor ports. Gateway 106 may be configured with gateway software to act as a message broker between controllers 104 and data store 108. Data store 108 may provide persistent storage of data, such as, e.g., raw sensor data, processed sensor data, sensor descriptions, or any other type of data. Data store 108 may also provide sensor data services, which may include, e.g., a query and rules engine to access sensor data, a processing engine to process sensor data and trigger a response (e.g., turn on a light, activate an alarm siren, or transmit a communication), sensor data analytics and visualization, or any other sensor data service. Data store 108 may be located locally on gateway 106, on a same local area network, on a wide area network, on the Internet, etc.

Sensors 102 may be configured on controllers 104 by performing a setup step, a data access step, and a data processing step, each of which may include one or more sub-steps. Generally, the setup step sets up sensor 102 on controller 104 by, e.g., enabling and identifying ports, configuring speed, etc. The data access step reads data from the identified port using commands of controller 104. The data processing step allows post processing of the data (e.g., for calibration, data conversion, etc.).

Figure 2:
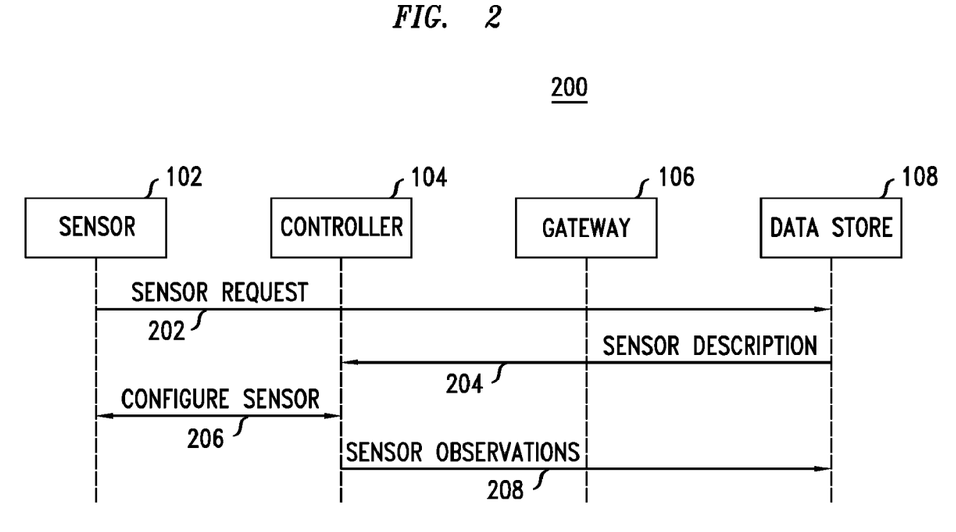
FIG. 2 shows a high-level message diagram for configuring sensors on controllers.

FIG. 2 shows a high-level message diagram 200 for configuring sensors 102 on controllers 104 in accordance with one or more embodiments. Boxes at the top of diagram 200 represent elements of a sensor network, such as, e.g., architecture 100. Messages are shown in time starting from top to bottom. At message 202, a request to get sensor data is sent from sensor 102, through controller 104 and gateway 106, to data store 108. The request is sent in accordance with a communications interface of controller 104. The request may include information identifying sensor 102. In one embodiment, information identifying sensor 102 may include specifications of sensor 102, such as, e.g., a name, type, model, serial number, data port number, uniform resource identifier, etc. In another embodiment, sensor 102 may be colored according to, e.g., a sensor type, a communications interface type, etc., and controller 104 may include a color detector to identify sensor 102 based on the detected color.

Data store 108 provides a sensor description based on the request from sensor 102. Sensor descriptions may be predefined by a manufacturer, extracted from datasheets of sensor 102 provided by the manufacturer, predefined by a user (e.g., using a web interface or an app), etc. The sensor description is defined in a format of the domain specific language. The domain specific language provides a set of commands to allow users to specify an ordered set of instructions for, e.g., configuring sensors 102 on controllers 104 (e.g., by performing the setup, data access, and data processing steps). In one example, the domain specific language may be in the JSON (JavaScript Object Notation) format, however any other suitable format may also be employed, such as, e.g., XML (Extensible Markup Language) and RDF (Resource Description Format). In one embodiment, the domain specific language supports sensors 102 outputting raw analog or digital reads and writes, In other embodiments, the domain specific language may be extended to support non-standard interfaces of sensors 102 by adding new sensor descriptions and corresponding mappings, as will be discussed below. The domain specific language may also support interrupt handling, math operations (e.g., addition, subtraction, multiplication, and division), and other basic functions. The sensor description is defined to include instructions as workflow steps (e.g., setup, data access, data processing steps).

At message 204, the sensor description in the format of the domain specific language is sent from data store 108, through gateway 106, to controller 104. Controller 104 locally stores one or more sensor descriptions in the format of the domain specific language. Upon receiving an incoming message including a sensor description, controller 104 starts a new thread to parse instructions from the sensor description. Controller 104 may group the parsed instructions as an ordered sequence of instructions (e.g., according to the setup, data access, and data processing steps). Controller 104 then maps the instructions parsed from the sensor description in the format of the domain specific language to commands of the controller 104. Mapping may include searching a lookup table, which provides a searchable list of domain specific language commands corresponding to controller commands.

Controller 104 thus provides an abstracted control interface which provides configuration (e.g., add sensor) and operational (e.g., reset) abstractions from for sensors 102 of any type. Advantageously, the same software can run on each controller 104 regardless of sensors 102 and different units of controller 104 can be supported by providing different mappings from the sensor domain specific language to the microcontroller.

At message 206, sensor 102 is configured according to the instructions in the domain specific language by performing the corresponding commands of controller 104. At message 208, one or more sensor observations may then be sent from controller 104, through gateway 106, to data store 108. Data store 108 may store the sensor observations, process the sensor observations, apply sensor data services, etc.

Figure 3:
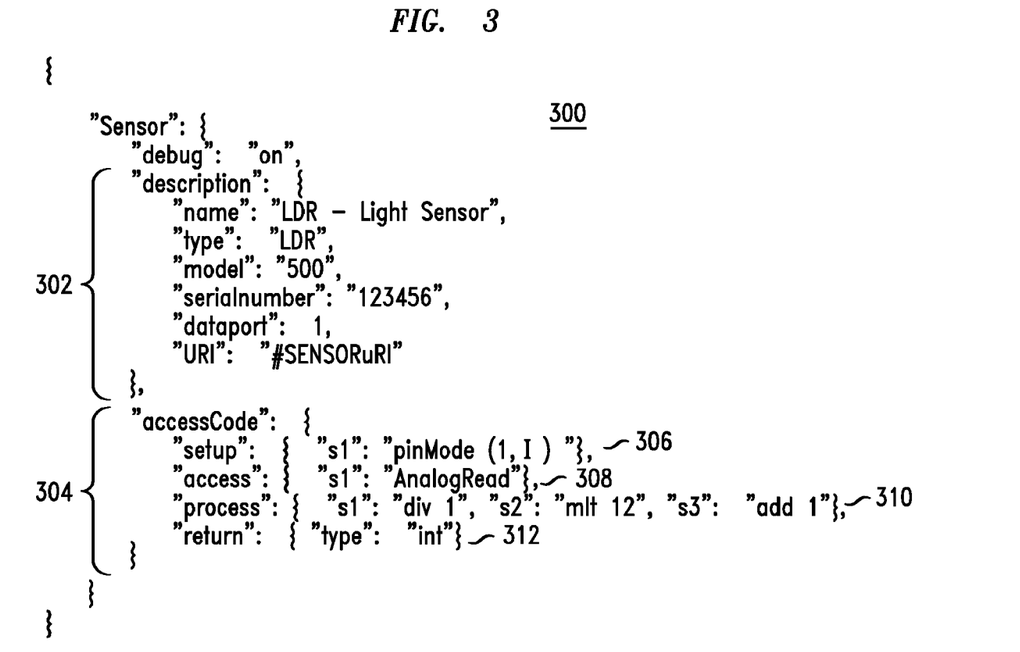
FIG. 3 shows an exemplary sensor description for adding a light sensor to a controller.

FIG. 3 shows an exemplary sensor description 300 for adding a light sensor 102 to a controller 104, in accordance with one or more embodiments. Light sensor 102 sends a request to get sensor data through controller 104 and gateway 106 to data store 108, which may include information identifying light sensor 102. Based on the identifying information of light sensor 102, data store 108 may determine a corresponding sensor description 300, which may include instructions for adding and configuring sensor 102 on controller 104. Generally, the instructions include the following steps: 1) Setup: enable and switch data pin on controller 104 to input mode; 2) Data Access: perform an analog read of the pin; and 3) Data Processing: carry out conversion of the accessed data. Sensor description 300 is defined in the format of the domain specific language. In FIG. 3, sensor description 300 is shown in JSON format.

Sensor description 300 includes a description portion 302 and an accessCode portion 304. Description portion 302 includes information of the sensor, such as, e.g., name, type, model, serial number, data port, and uniform resource identifier (URI). accessCode portion 304 includes instructions for configuring and/or managing sensor 102, identified in description portion 302. The instructions may be sequentially ordered for setup step 306, data access step 308, data processing step 310, and return step 312. Each step may include any number of sub-steps (e.g., labeled s1, s2, etc. in accessCode portion 304) which are executed in order.

Setup step 306 includes sub-step s1 for enabling and configuring pin 11 with mode I. Data access step 308 includes sub-step s1 for reading an analog voltage of the pin 11. Data processing step 310 includes sub-step s1 for dividing the analog voltage by 1, sub-step s2 for multiplying the result by 12, and sub-step s3 for adding the result with 1.

Return step 312 returns the end result as an integer. Each step of accessCode portion 304 is parsed to map each sub-step to a command of the controller.

Sensor description 300 is sent from data store 108 to controller 104, which stores sensor description 300 locally. Controller 104 periodically checks for incoming messages and, upon determining a new sensor description 300, controller 104 starts a thread to parse sensor description 300. The parser reads the incoming sensor description 300 and parses the instructions into steps (e.g., setup, data access, data processing) and sub-steps. In one embodiment, parsing includes searching sensor description 300 for the "accessCode" tag, and within the identified accessCode portion, searching for tags indicating different steps (e.g., setup, access, process tags in accessCode portion 304). For the setup step 304 (and other steps, e.g., data access 308 and data processing 310), the parser identifies the portion after the colon of the tag and between the brackets { } to further identify the step tags "s". The parsed instructions may be grouped into a sequence of steps and ordered within each step according to a step number indicated after the step tags "s".

Controller 104 then maps each parsed instruction to a command of the controller 104. In one embodiment, mapping includes searching a lookup table. The lookup table may provide instructions in the domain specific language and the corresponding command that may be performed by controller 104. Mapping may be implemented by, e.g., employing if-then-else code. Other embodiments of mapping may also be employed.

Figure 4:
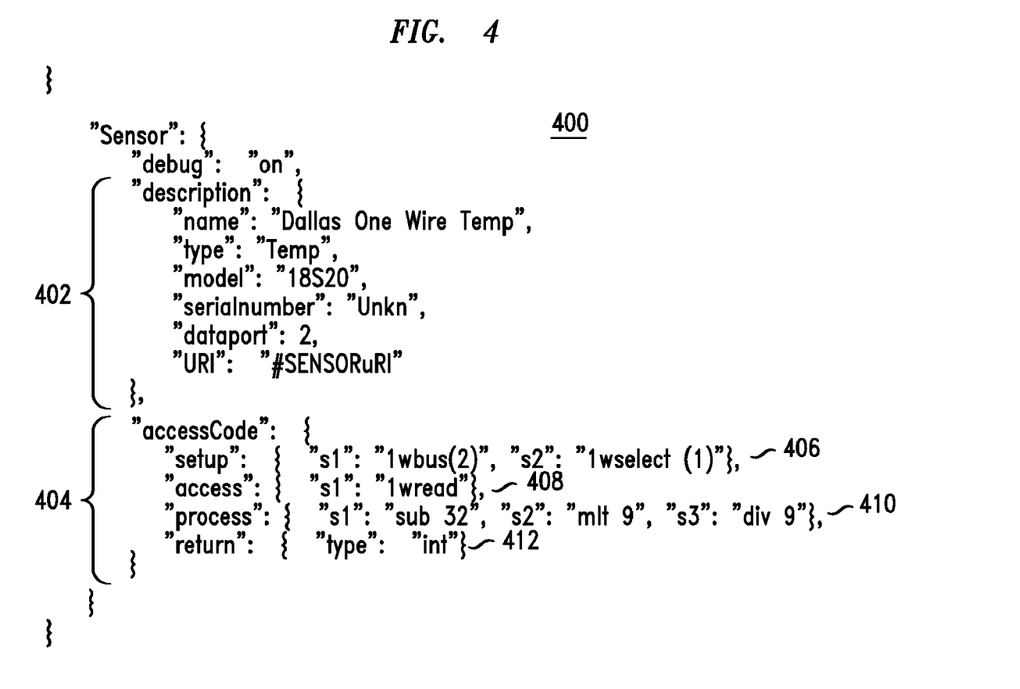
FIG. 4 shows an exemplary sensor description for adding a temperature sensor to a controller.

FIG. 4 shows an exemplary sensor description 400 for adding temperature sensor 102 to controller 104, in accordance with one or more embodiments. Sensor description 400 is defined in the JSON format. Sensor description 400 allows digital temperature sensor 102 having a 1-wire interface to be configured on sensor port 2 of controller 104. Sensor description 400 includes description portion 402 including information of sensor 102 and accessCode portion 404 including instructions for configuring and/or managing sensor 102 on controller 104. Setup step 406 includes sub-step s1 for setting up the bus for sensor port 2, and sub-step s2 for selecting the first device on the bus. Data access step 408 includes sub-step s1 for reading a value from the first device. Data processing step 410 comprises instructions for converting the value to Celsius, including sub-step s1 for subtracting 32 from the read value, sub-step s2 for multiplying the value by 9, and sub-step s3 for dividing the result by 9. Return step 412 returns the end result as an integer. Instructions from sensor description 400 may be parsed and mapped by controller 104 similar to sensor description 300 in FIG. 3.

Figure 5:
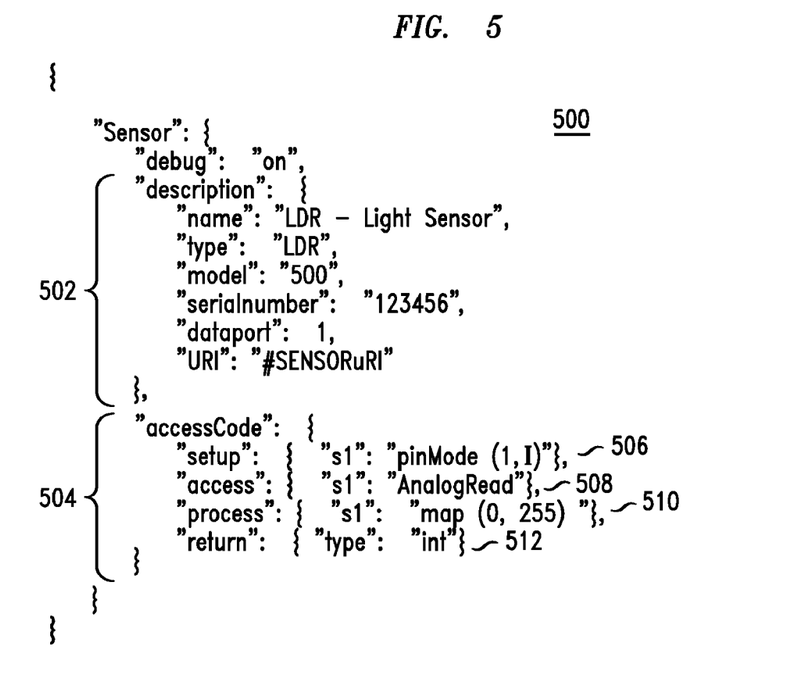
FIG. 5 shows an exemplary sensor description for adding a light sensor to a controller.

FIG. 5 shows an exemplary sensor description 500 for adding light sensor 102 to controller 104, in accordance with one or more embodiments. Sensor description 500 is defined in the JSON format. Sensor description 500 includes description portion 502 including information of sensor 102 and accessCode portion 504 including instructions for managing and/or configuring sensor 102 on controller 104. Setup step 506 includes sub-step s1 for enabling and configuring the sensor on pin 1. Data access step 508 includes sub-step s1 for reading an analog voltage on pin 1. Data processing step 510 includes sub-step s1 for mapping the analog voltage to a value between 0 and 255. Return step 512 returns the end result as an integer. Instructions from sensor description 500 may be parsed and mapped by controller 104 similar to sensor description 300 in FIG. 3.

Figure 6:
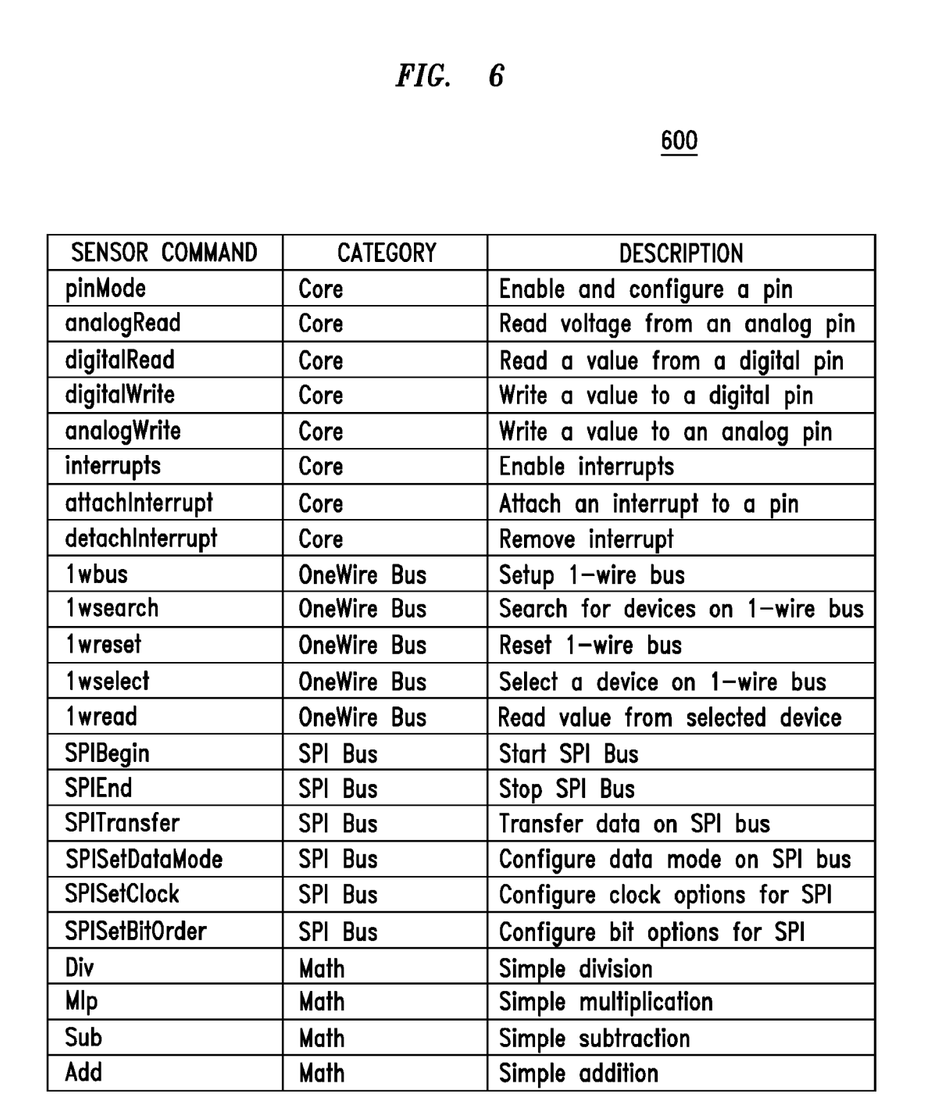
FIG. 6 shows a list of exemplary commands implemented by a controller.

FIG. 6 shows a list 600 of exemplary commands which may be implemented or performed by controller 104 in accordance with one or more embodiments. For example, controller 104 may include an Atmel Atmega 328 processor with 1-Wire and SPI buses. List 600 shows controller commands having a corresponding category and description. Controller 104 maps instructions parsed from sensor descriptions (e.g., sensor descriptions 300, 400, 500) to one or more commands of controller 102, such as, e.g., the commands shown in list 600.

Figure 7:
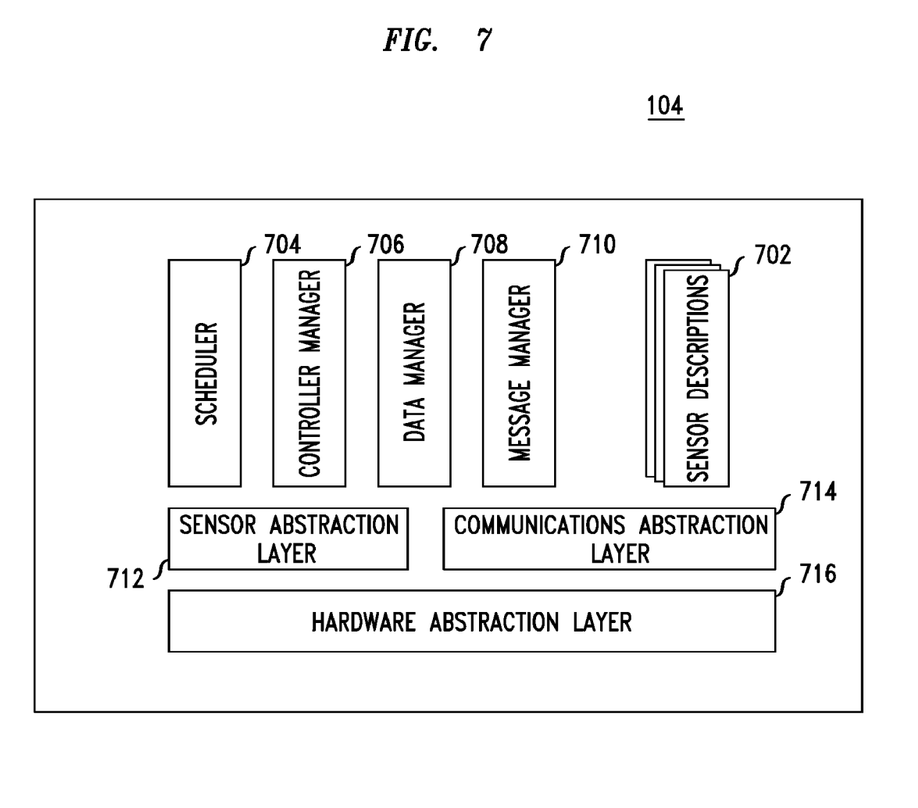
FIG. 7 shows a block diagram of a controller.

FIG. 7 shows a block diagram of controller 104 in accordance with one or more embodiments. Controller 104 includes controller manager 706, which is a general purpose system manager for controller 104. Controller 104 also includes message manager 710, which periodically listens for messages received on incoming channels (e.g., from sensor 102 or data store 108). Message manager 710 may interface with communications abstraction layer 714 for sending or receiving messages. Communications abstraction layer 714 implements a communications interface on controller 104 (e.g., WiFi, Bluetooth, ZigBee, etc.).

Message manager 710 processes the received message based on the message header and/or type of message. For example, the message may include a control message including sensor descriptions (e.g., sensor descriptions 300, 400, 500) for configuring the sensor. The control message including sensor descriptions may be received from data store 108 (via gateway 106) and stored locally at controller 104 as sensor descriptions 702 by data manager 708. In another example, the message may include an observation message from sensor 102. New incoming sensor descriptions may overwrite sensor descriptions 702 stored locally on controller 104, be stored in sensor descriptions 702 as an addition, or may implement a management type operation (e.g., reboot).

Sensor abstraction layer 712 starts a new thread via scheduler 704 for each new sensor description to parse instructions from the sensor description. It is expected that setup stage instructions are executed once upon startup, and the data access and post-processing instructions are executed according to the reporting interval for the sensor. Hardware abstraction layer 716 provides a mapping between the parsed instructions from the sensor descriptions and the controller specific commands of controller 104. In one embodiment, hardware abstraction layer 716 searches a lookup table, which provides a searchable list of domain specific instructions associated with the controller specific commands.

The domain specific language may be implemented using a number of different approaches. In one embodiment, e.g., where controller 104 supports dynamic loaders (i.e., runtime selection, loading and execution of a library), a late binding approach may be implemented in the mapping function (e.g., hardware abstraction layer 716 in controller 104). The mapping function uses a description of the modules to load and the mappings between high level domain specific language grammar and low level libraries of controller 104 to perform the mapping. In another embodiment, an early binding approach may be used, where all low level libraries are loaded at program initialization.

The domain specific language (for both early and late binding) may be extended by adding new commands to the domain specific language and/or by adding new corresponding mapping instructions to the mapping function of controller 104. New corresponding mapping instructions may also be added to support a controller of a different type (e.g., different family). Extension of the domain specific language may be implemented in a static (e.g., at compile time) or dynamic (e.g., at runtime) manner, depending on the requirements of the system. Advantageously, this eliminates the need for custom programming or setup when new sensor devices are added, thus enabling must easier setup and configuration of sensor devices.

Calibration of sensor 102 can be carried out by adjusting the data processing portion of the instructions to adapt the behavior of sensor 102 based on local calibrated measurements. For example, instructions corresponding to data processing portions 310, 410, 510 can be adjusted based on externally received data from a ground truth source either before, during or after the calibration process. Calibration may be continually performed and/or may be performed at regular intervals thereafter.

Figure 8:
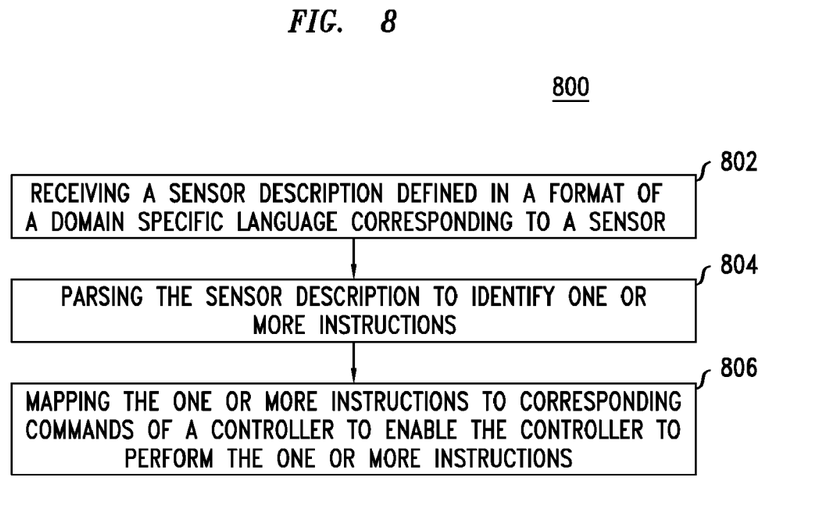
FIG. 8 shows a flow diagram of a method for configuring a sensor on a controller.

FIG. 8 shows a flow diagram of a method 800 for configuring a sensor on a controller, in accordance with one or more embodiments. At step 802, a sensor description corresponding to the sensor is received by the controller. The sensor description may be defined in a format of a domain specific language (e.g., in data store 108). The sensor descriptions may be, e.g., predefined by a user or manufacturer, extracted from sensor datasheets, etc. The sensor description corresponding to the sensor may be determined based on messages received from the sensor. For example, the message received from the sensor may be a request to get sensor data, which may include information identifying the sensor, such as, e.g., specifications of the sensor. In one embodiment, the domain specific language includes JSON. The messages received from the sensor may be sent according to an I2C, SPI, or 1-wire standard, but may also be sent according to other standard or non-standard communication interfaces. The sensor description may include instructions for a plurality of steps, such as, e.g., a setup step, a data access step, and a data processing step. Each of the plurality of steps may have one or more sub-steps.

At step 804, the sensor description is parsed to identify one or more instructions. Parsing may include searching for tags in the sensor description. For example, the tags in the sensor description may include tags indicating access instructions portion (e.g., an accessCode tag), tags indicating steps (e.g., setup, access, process tags), tags indicating sub-steps of those steps (e.g., s1, s2, s3), or any other tag. In one embodiment, the identified instructions may be grouped into an ordered sequence of instructions according to the steps and substeps.

At step 806, the one or more instructions are mapped to corresponding commands of the controller to enable the controller to perform the one or more instructions. In one embodiment, mapping the one or more instructions includes searching a lookup table, which provides a searchable list of domain specific language instructions and corresponding commands implementable by the controller. The controller can thus perform the one or more instructions by executing the corresponding commands. Different controller units can be supported by providing different mappings from the domain specific language to commands of the controller.

In one embodiment, the domain specific language may be expanded, e.g., to support non-standard communication interfaces, by adding new instructions to the domain specific language and mappings of the new instructions to corresponding commands of the controller.

Advantageously, method 800 allows for sensor controllers and gateways to be created cheaply and simply with the task specific functionality pushed or pulled if and when needed only. Such an approach is flexible, future proof, and modular, which allows for mass customization and specialization of sensing nodes.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIG. 8. Certain steps of the methods described herein, including one or more of the steps of FIG. 8, may be performed by a server or by another processor in a network-based cloud-computing system. Certain steps of the methods described herein, including one or more of the steps of FIG. 8, may be performed by a client computer in a network-based cloud computing system. The steps of the methods described herein, including one or more of the steps of FIG. 8, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 8, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 9:
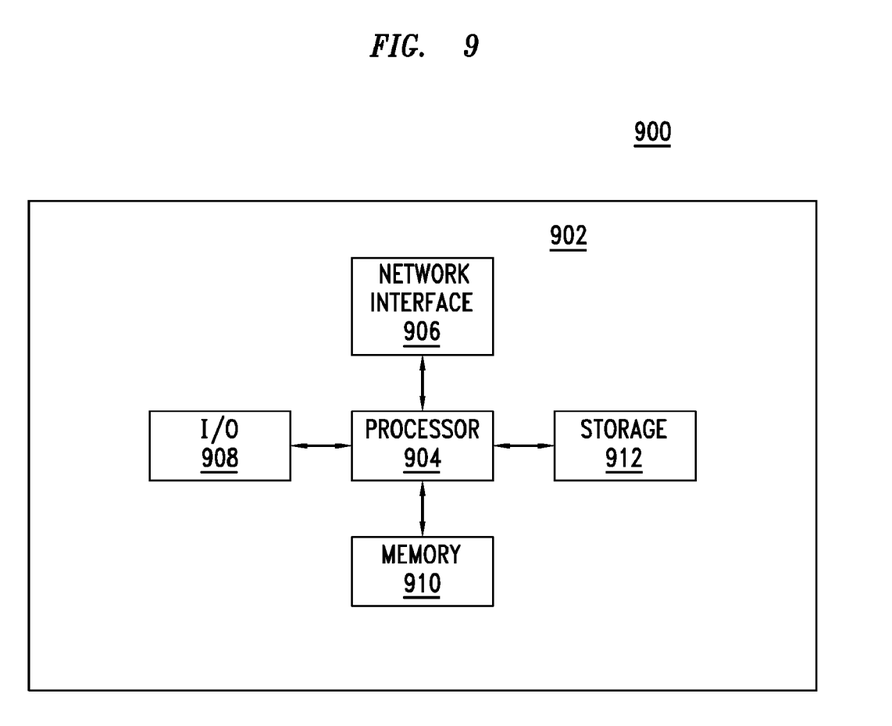
FIG. 9 shows a high-level block diagram of a computer for configuring sensors on a controller.

A high-level block diagram 900 of an example computer that may be used to implement systems, apparatus, and methods described herein is depicted in FIG. 9. Computer 902 includes a processor 904 operatively coupled to a data storage device 912 and a memory 910. Processor 904 controls the overall operation of computer 902 by executing computer program instructions that define such operations. The computer program instructions may be stored in data storage device 912, or other computer readable medium, and loaded into memory 910 when execution of the computer program instructions is desired. Thus, the method steps of FIG. 8 can be defined by the computer program instructions stored in memory 910 and/or data storage device 912 and controlled by processor 904 executing the computer program instructions. For example, the computer program instructions can be implemented as computer executable code programmed by one skilled in the art to perform the method steps of FIG. 8. Accordingly, by executing the computer program instructions, the processor 904 executes the method steps of FIG. 8. Computer 902 may also include one or more network interfaces 906 for communicating with other devices via a network. Computer 902 may also include one or more input/output devices 908 that enable user interaction with computer 902 (e.g., display, keyboard, mouse, speakers, buttons, etc.).

Processor 904 may include both general and special purpose microprocessors, and may be the sole processor or one of multiple processors of computer 902. Processor 904 may include one or more central processing units (CPUs), for example. Processor 904, data storage device 912, and/or memory 910 may include, be supplemented by, or incorporated in, one or more application-specific integrated circuits (ASICs) and/or one or more field programmable gate arrays (FPGAs).

Data storage device 912 and memory 910 each include a tangible non-transitory computer readable storage medium. Data storage device 912, and memory 910, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 908 may include peripherals, such as a printer, scanner, display screen, etc. For example, input/output devices 908 may include a display device such as a cathode ray tube (CRT) or liquid crystal display (LCD) monitor for displaying information to the user, a keyboard, and a pointing device such as a mouse or a trackball by which the user can provide input to computer 902.

Any or all of the systems and apparatus discussed herein, including elements of architecture 100 of FIG. 1 and controller 104 of FIG. 7, may be implemented using one or more computers such as computer 902.

One skilled in the art will recognize that an implementation of an actual computer or computer system may have other structures and may contain other components as well, and that FIG. 9 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method, comprising:
    parsing a sensor description defined in a language corresponding to a sensor to identify one or more instructions;
    mapping the one or more instructions to corresponding commands of a controller; and
    executing the corresponding commands on the controller to perform the one or more instructions on the controller.

2. The method as recited in claim 1, wherein executing the corresponding commands on the controller to perform the one or more instructions on the controller comprises:
    configuring the sensor on the controller.

3. The method as recited in claim 1, wherein executing the corresponding commands on the controller to perform the one or more instructions on the controller comprises:
    facilitating a transmission of data between the sensor and the controller.

4. The method as recited in claim 1, wherein executing the corresponding commands on the controller to perform the one or more instructions on the controller comprises:
    processing data from the sensor.

5. The method as recited in claim 1, wherein mapping the one or more instructions to corresponding commands of the controller comprises:
    identifying the corresponding commands of the controller in a lookup table based on the one or more instructions.

6. The method as recited in claim 5, further comprising:
    adding a mapping to the lookup table to associate another instruction with another corresponding command of the controller, the other instruction being associated with a language corresponding to a different sensor.

7. The method as recited in claim 1, further comprising:
    calibrating the sensor by adjusting the one or more instructions in the sensor description.

8. The method as recited in claim 1, wherein the sensor description is determined based on a message received from the sensor.

9. The method as recited in claim 8, wherein the message received from the sensor comprises a request for sensor data.

10. A non-transitory computer readable medium storing computer program instructions, which, when executed on a processor, cause the processor to perform operations comprising:
    parsing a sensor description defined in a language corresponding to a sensor to identify one or more instructions;
    mapping the one or more instructions to corresponding commands of a controller; and
    executing the corresponding commands on the controller to perform the one or more instructions on the controller.

11. The non-transitory computer readable medium as recited in claim 10, wherein executing the corresponding commands on the controller to perform the one or more instructions on the controller comprises:
configuring the sensor on the controller.

12. The non-transitory computer readable medium as recited in claim 10, wherein executing the corresponding commands on the controller to perform the one or more instructions on the controller comprises:
facilitating a transmission of data between the sensor and the controller.

13. The non-transitory computer readable medium as recited in claim 10, wherein executing the corresponding commands on the controller to perform the one or more instructions on the controller comprises:
processing data from the sensor.

14. The non-transitory computer readable medium as recited in claim 10, the operations further comprising:
calibrating the sensor by adjusting the one or more instructions in the sensor description.

15. A controller, comprising:
a processor; and
a memory to store computer program instructions, the computer program instructions when executed on the processor cause the processor to perform operations comprising:
parsing a sensor description defined in a language corresponding to a sensor to identify one or more instructions;
mapping the one or more instructions to corresponding commands of the controller; and
executing the corresponding commands on the controller to perform the one or more instructions on the controller.

16. The controller as recited in claim 15, wherein executing the corresponding commands on the controller to perform the one or more instructions on the controller comprises:
configuring the sensor on the controller.

17. The controller as recited in claim 15, wherein mapping the one or more instructions to corresponding commands of the controller comprises:
identifying the corresponding commands of the controller in a lookup table based on the one or more instructions.

18. The controller as recited in claim 17, the operations further comprising:
adding a mapping to the lookup table to associate another instruction with another corresponding command of the controller, the other instruction being associated with a language corresponding to a different sensor.

19. The controller as recited in claim 15, wherein the sensor description is determined based on a message received from the sensor.

20. The controller as recited in claim 19, wherein the message received from the sensor comprises a request for sensor data.

* * * * *